(12) United States Patent     (10) Patent No.: US 12,583,636 B2

Stepura et al.     (45) Date of Patent: Mar. 24, 2026

(54) LANDING SYSTEM FOR A FIXED-WING UNMANNED AERIAL VEHICLE (UAV)

(71) Applicant: Oleksandr Stepura, Kyivska oblast (UA)

(72) Inventors: Oleksandr Stepura, Kyivska oblast (UA); Volodymyr Stepura, Kyivska oblast (UA)

(73) Assignee: Oleksandr Stepura, Kyivska oblast (UA)

( * ) Notice: Subject to any disclaimer, the term of this patent is extended or adjusted under 35 U.S.C. 154(b) by 0 days.

(21) Appl. No.: 19/239,404

(22) Filed: Jun. 16, 2025

(65) Prior Publication Data

US 2025/0382079 A1     Dec. 18, 2025

(30) Foreign Application Priority Data

Jun. 14, 2024    (UA) ............................... a 2024 03143

(51) Int. Cl.
| | |
|---|---|
| *B64U 70/83* | (2023.01) |
| *B64U 10/25* | (2023.01) |
| *B64U 70/40* | (2023.01) |
| *B64U 70/87* | (2023.01) |

(52) U.S. Cl.
CPC ............. *B64U 70/83* (2023.01); *B64U 10/25* (2023.01); *B64U 70/87* (2023.01); *B64U 70/40* (2023.01)

(58) Field of Classification Search
CPC ........ B64U 70/83; B64D 17/80; B64C 27/006
See application file for complete search history.

(56) References Cited

U.S. PATENT DOCUMENTS

| | | |
|---|---|---|
| 8,191,831 B2 | 6/2012 | Nadir |
| 11,884,406 B2 | 1/2024 | Shih et al. |

FOREIGN PATENT DOCUMENTS

| | | |
|---|---|---|
| EP | 1 827 972 B1 | 9/2008 |
| WO | 2013/062608 A2 | 5/2013 |

*Primary Examiner* — Timothy D Collins
*Assistant Examiner* — Eric Acosta
(74) *Attorney, Agent, or Firm* — Saliwanchik, Lloyd & Eisenschenk

(57) ABSTRACT

A landing system for a fixed-wing unmanned aerial vehicle (UAV), the system comprising a parachute arranged in a parachute compartment that is secured to a fuselage tail section, and suspension lines for securing to the fuselage are fixed in four points on a fuselage lower part symmetrically relative to the UAV's center of gravity. The parachute compartment interacts with a detachment mechanism secured on a bulkhead of the tail section and comprises pins that are hinged to rods secured on a central rotatable disc coupled to at least one servomotor by means of a spring-loaded rod, the pins are mounted in guides, free ends of the pins fit into corresponding holes along a parachute compartment perimeter. The system further comprises an airbag coupled to an impeller and arranged in an onboard compartment that is arranged in a fuselage upper part and closed with a hinged hatch cover.

8 Claims, 7 Drawing Sheets

LANDING SYSTEM FOR A FIXED-WING UNMANNED AERIAL VEHICLE (UAV)

CROSS-REFERENCE TO RELATED APPLICATION

This application claims priority to Ukrainian Application No. a 2024 03143, filed Jun. 14, 2024, which is hereby incorporated by reference in its entirety.

FIELD OF THE INVENTION

The claimed invention relates to a field of unmanned aviation, and it concerns a fuselage landing system for landing an unmanned aerial vehicle (UAV) on an airbag using a parachute.

BACKGROUND

Fixed-wing UAVs usually take off by means of launchers, and they are not equipped with their own take-off means of a chassis type, thus, their landing must be carried out either using external capturing systems such as nets or landing cables, etc., or they must have their own landing means on a fuselage.

Landing means and methods are developed depending on a structure and purpose of the UAV. If there are payload elements, in particular, photo and video cameras that are arranged under the wings or under the UAV fuselage for their effective operation, the landing must be primarily designed with consideration of protection of these elements from ground impact.

To this end, inverted landing systems for UAVs are developed as described in a patent EP1827972B1 dated Sep. 10, 2008, that discloses a method for landing a fixed-wing aircraft, the method comprises performing an inversion maneuver so that the aircraft's upper part faces the ground, and the aircraft's lower part faces away from the ground. After initiation or completion of this maneuver, a deep stall is induced, and the aircraft descends almost vertically to land on its upper part, thus minimizing impact loads or damage of the UAV lower part. In this solution, both inversion and absorption of impact energy are performed due to a configuration of the wing, in particular, specially designed flaps which are positionally adjusted by means of a positioning system for performing a landing maneuver and that are destroyed upon impact with the landing surface, thereby protecting other fuselage components. However, this solution implies a destruction of at least wing elements which should be replaced and upgraded.

An application WO2013062608A dated May 2, 2013, discloses an inverted-landing UAV that is provided with a system of controlled surfaces, in particular, ailerons, that act as flaps during remote control of the landing and ensure carrying out a deep stall maneuver and gaining a vertical inverted position of the UAV. Therewith, a polypropylene cushion is arranged on a fuselage upper part, the cushion is located above the wings and absorbs a landing force, while fragile tail tips further stabilize a horizontal position of the UAV. This design ensures preservation of a content within a payload compartment and a propeller, however, it is destructive for other elements, besides, the polypropylene chassis is subjected to wear upon hitting and braking as well as has a limited service life.

The most common landing of the UAV is a landing by means of an evacuation parachute. After deployment, the parachute descends with a vertical speed that is a result of a ratio between a parachute size, weight, and shape of the UAV. During the vertical descent that is ensured by the parachute, the UAV further has a horizontal speed that is caused primarily by air flows that may cause a problem, when the UAV reaches a landing surface, since the parachute continues to drift and may drag the UAV along the surface with a tilted position, thereby damaging its elements.

Thus, the parachute landing requires precise calculation of the parachute opening times as illustrated, e.g., in a U.S. Pat. No. 11,884,406B2 dated Jan. 30, 2024, that discloses a method and a system for controlling a parachute landing of a non-chassis UAV, where an onboard computer, when making a decision regarding parachute deployment, takes into account a flight speed, a wind speed, a wing direction, a position, and a height of the UAV, and opens the parachute only when a landing position meets all predefined criteria. All modern UAVs are equipped with a rather complex software that controls operation of power supply units and operating units, controls a mission that is being accomplished by the UAV and monitors flight conditions, i.e., flight range, height, etc. In this case, use of additional resources for individual programs for controlling the UAV landing further complicates existing technologies and may affect not only operational costs, but also operational consistency, and they may be insufficient for protecting a fuselage against impact loads.

Also, a combination of the parachute and an airbag is used as fuselage landing system that is intended to maximize the absorption of the impact loads during landing to protect the aerial vehicle's components and its onboard equipment.

In particular, use of the combination of the landing parachute that ensures the vertical descent of the UAV and the airbag is disclosed in a U.S. Pat. No. 8,191,831B2 dated Jun. 5, 2012. This solution discloses a landing system comprising a parachute that is arranged in a parachute compartment at a bottom of a fuselage tail section and an airbag that is coupled to a pressurizing tool thereof, e.g., an impeller, and arranged in an onboard compartment with a hinged hatch cover that is provided at a bottom of a fuselage nose adjacent to a payload. Parachute suspension lines are passed along a fuselage upper part and centrally secured in the UAV's mass point between its wings using a mechanism for disconnection of the parachute during landing. During the landing, the folded parachute may be released from a parachute container by its opening, and it is extended to a vertical descent position under the action of aerodynamic forces, while the airbag becomes free of a container cap during its pressurization and closes the payload compartment upon deployment. This document explicitly discloses a parachute release mechanism that is actuated when the UAV comes into contact with a landing surface, thus, it is aimed at solving a task to avoid a tilt of the UAV upon contact between the airbag and a landing point in view of influence of undesired airflows on the parachute.

A drawback of this solution is although the incline is avoided due to timely detachment of the parachute, the payload, although indirectly, receives an impact from the landing surface, since during landing, the UAV contacts the landing surface with a fuselage lower part. This design gives short weight to the fuselage lower part and displaces a UAV's center of gravity, thereby requiring balancing of another part thereof.

Therefore, there is a need in the field of the art to develop an energy-absorbing UAV landing system that takes into account advantages and drawbacks of the known prior art.

SUMMARY OF THE INVENTION

Embodiments of the invention provide a safe UAV landing system during a routine or emergency landing by ensuring an inverted vertical landing of the UAV using a combination of a landing parachute and an airbag.

This is achieved by providing a landing system for a fixed-wing UAV, the system comprises a parachute having a system of suspension lines that comprises suspension lines for securing to a fuselage, a central suspension line to which upper ends of the fuselage suspension lines are secured, and suspension lines of a parachute canopy, the parachute is arranged in a parachute compartment that is detachably coupled to a fuselage tail section and an airbag that is coupled to an impeller and arranged in an onboard compartment of the fuselage having a hinged hatch cover fixed thereon. According to certain embodiments, lower ends of the suspension lines for securing to the fuselage are fixed in four points on a fuselage lower part symmetrically relative to a UAV's center of gravity, while the detachability of the parachute compartment is ensured by a mechanism that is secured on a bulkhead on the fuselage tail section. Mentioned parachute compartment detachment mechanism comprises at least three pins that are hinged to rods that are secured on a central rotatable disc that is coupled to at least one servomotor by means of a spring-loaded rod, and the pins are mounted in guides such that free ends of the pins are capable of fitting into corresponding holes that are provided along a parachute compartment perimeter. This design of the parachute compartment detachment mechanism is characterized by structural simplicity, is reliable in securing the parachute compartment, and ensures fail-safe detachment of the parachute compartment as well as unhampered release of the parachute during landing, and combination thereof with mentioned securing of the suspension lines system ensures a UAV maneuver to take an inverted flight position without any risk of engagement or hover of the parachute on elements of the tail section or the parachute compartment.

The onboard compartment of the airbag is arranged in the fuselage upper part, and the hatch cover is secured to the compartment by means of a lock having a servomotor and a detent that are configured to release the hatch cover. Therewith, the impeller is configured to be turned on after opening of the hatch cover lock that is configured to be activated after the parachute compartment detachment mechanism is actuated. This arrangement and positioning of the airbag ensure landing on the fuselage upper part, while maintaining a horizontal position of the UAV, and softens the impact during landing, thereby minimizing a threat of damaging both the payload elements and other UAV elements, e.g., a propeller and wings. At the same time, a sequence of activation of initiating elements of the system allows to balance the actuation of both landing elements such that an aerodynamic component that is added to the fuselage by the airbag does not affect the deployment and release of the parachute into the vertical landing position.

A technical effect that is achieved upon implementation of the set of features of the claimed invention lies in increasing the actuation reliability of both landing devices in order to ensure a safe UAV landing and to protect its onboard equipment.

According to a preferable exemplary embodiment of the invention, the rotatable disc is coupled to two servomotors using two spring-loaded rods that are connected to the disc's opposite sides in diametrically opposite directions. This design increases the synchronization of the pins exiting the holes of the parachute compartment.

According to another preferable exemplary embodiment of the invention, the central suspension line of the parachute and the suspension lines for securing to the fuselage are connected to each other via a pair of thick halyards having a parachute release mechanism between them, and the parachute release mechanism is configured to be actuated when the UAV contacts a landing point. This design ensures automatic disconnection of the parachute during landing, thereby avoiding any influence of undesired airflows on the parachute.

According to another exemplary embodiment of the invention, the parachute compartment is connected to the parachute, and the hinged hatch cover is connected to the fuselage by means of halyards, thereby allowing to avoid loss of and to preserve these elements for further use.

According to another exemplary embodiment of the invention, the parachute compartment is cone-shaped that provides it with enhanced aerodynamic characteristics both when it is a part of the UAV and when it is disconnected therefrom.

According to another exemplary embodiment of the invention an airbag perimeter in the deployed state is greater than a fuselage perimeter, thereby allowing to protect the entire fuselage against impact. Therewith, it is desired that the airbag has a parallelepiped shape or a shape of two elongated balloons in order to further stabilize a position of the wings and tail booms of the UAV.

BRIEF DESCRIPTION OF THE DRAWINGS

In order to provide further understanding of the claimed invention and its advantages, the following description offers an explanation of a possible implementation thereof with reference to the figures of the appended drawings, wherein identical reference numerals denote identical parts, and which illustrate the following:

Figure 1:
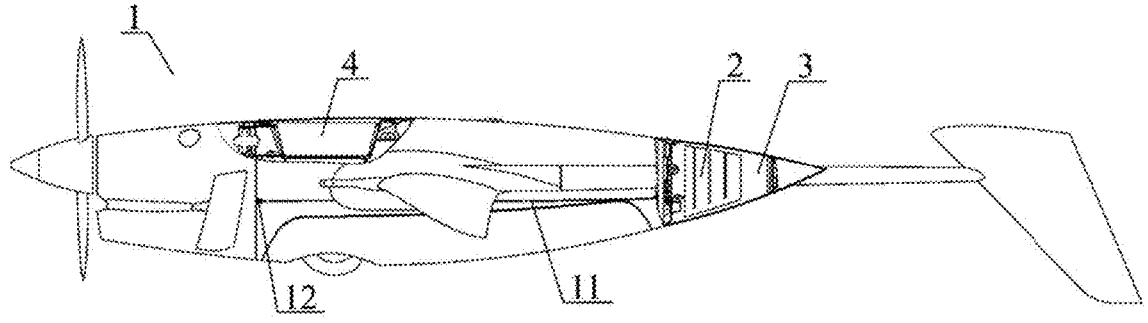
FIG. 1 illustrates a general view of the UAV that depicts cross-sectional views of the parachute compartment and the airbag in an equipped state.
Figure 2:
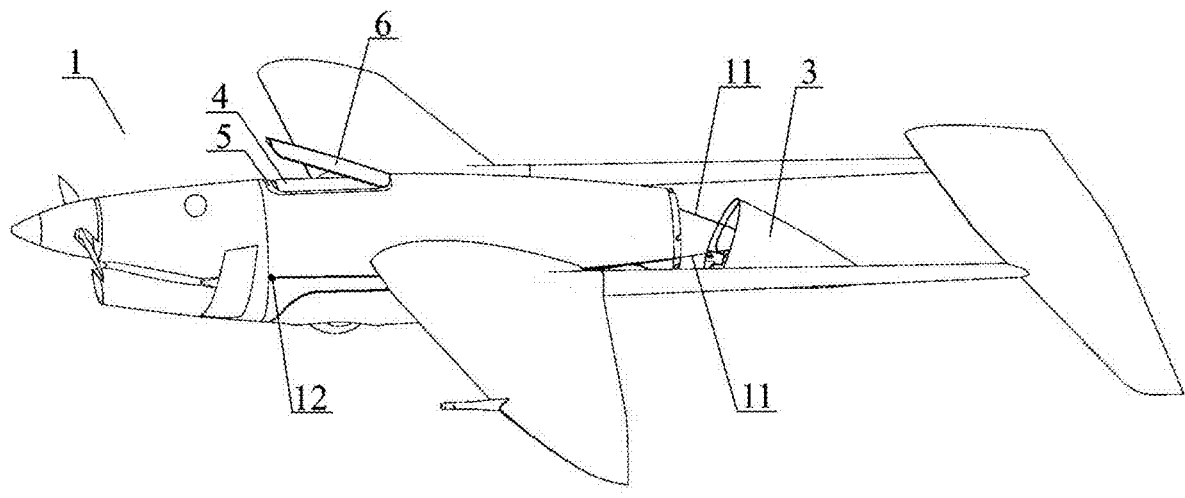
FIG. 2 illustrates a general UAV during opening of the parachute compartment and the airbag.
Figure 3:
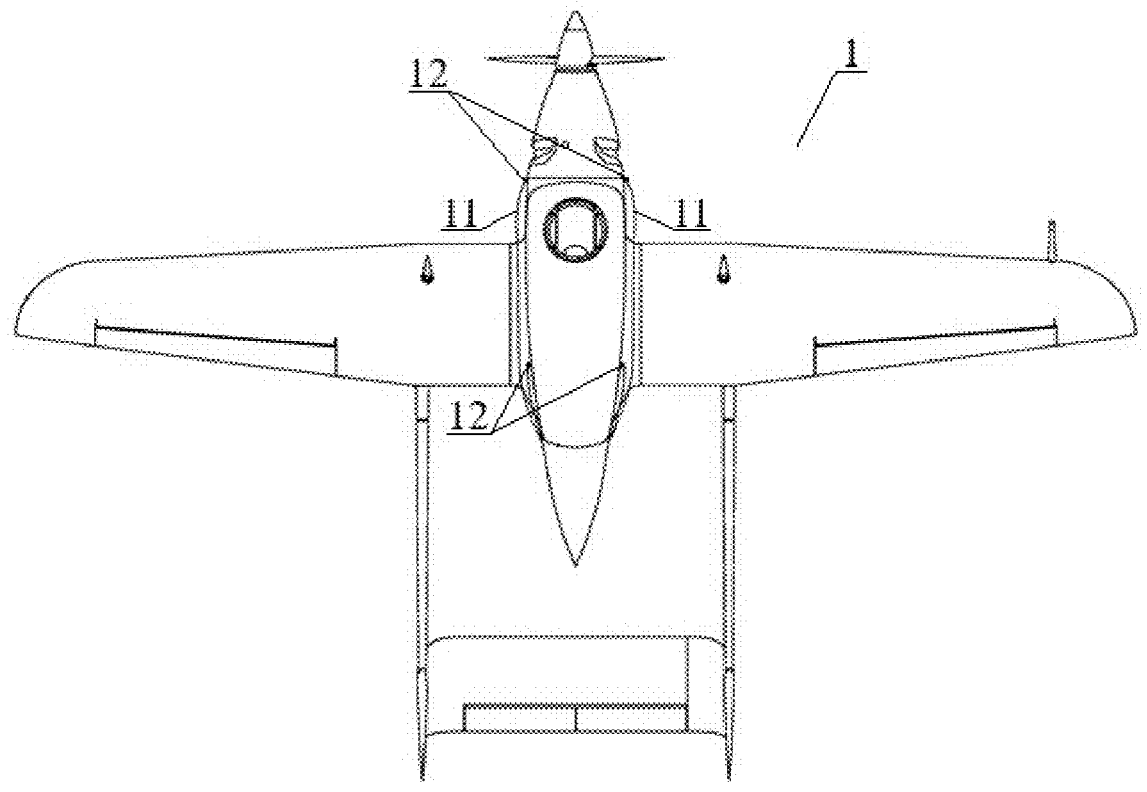
FIG. 3 illustrates a bottom view of the UAV that indicates securing points for the fuselage suspension lines.
Figure 4:
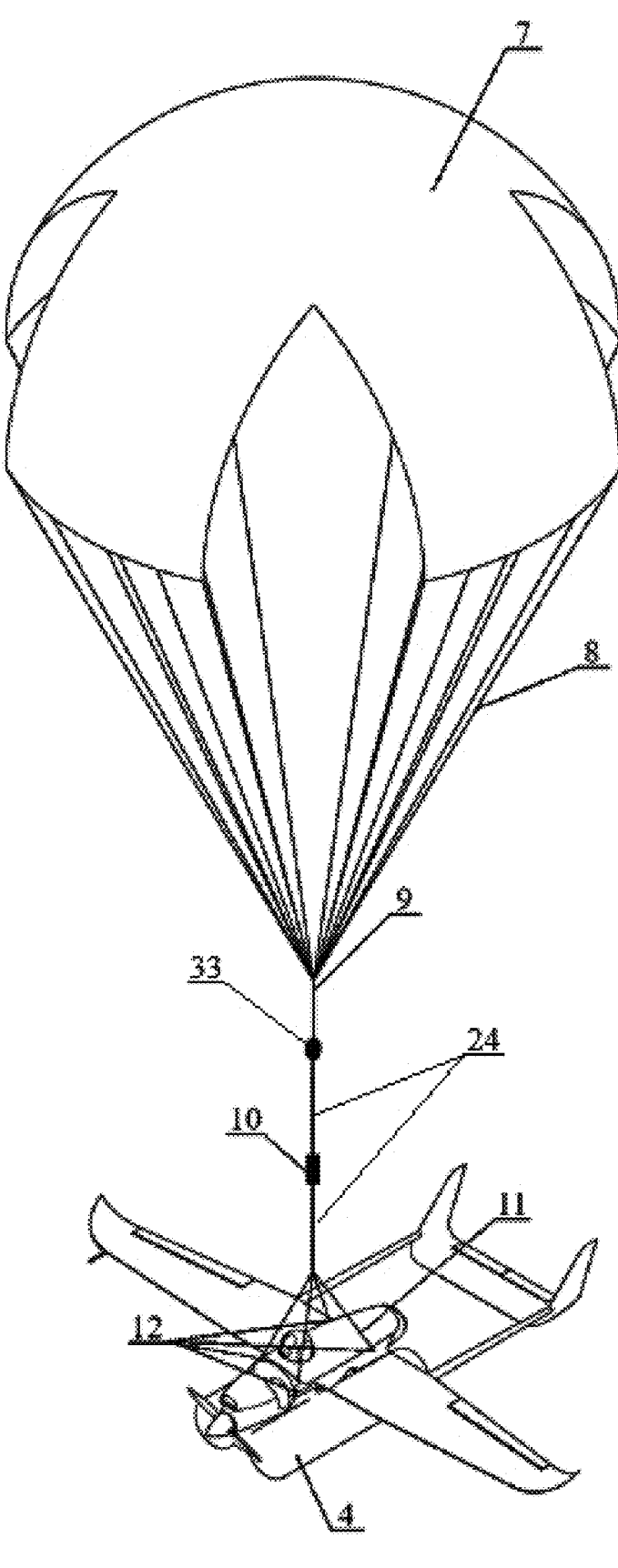
FIG. 4 illustrates a general view of the UAV with the deployed parachute and the inflated airbag during movement in the vertical landing position.
Figure 5:
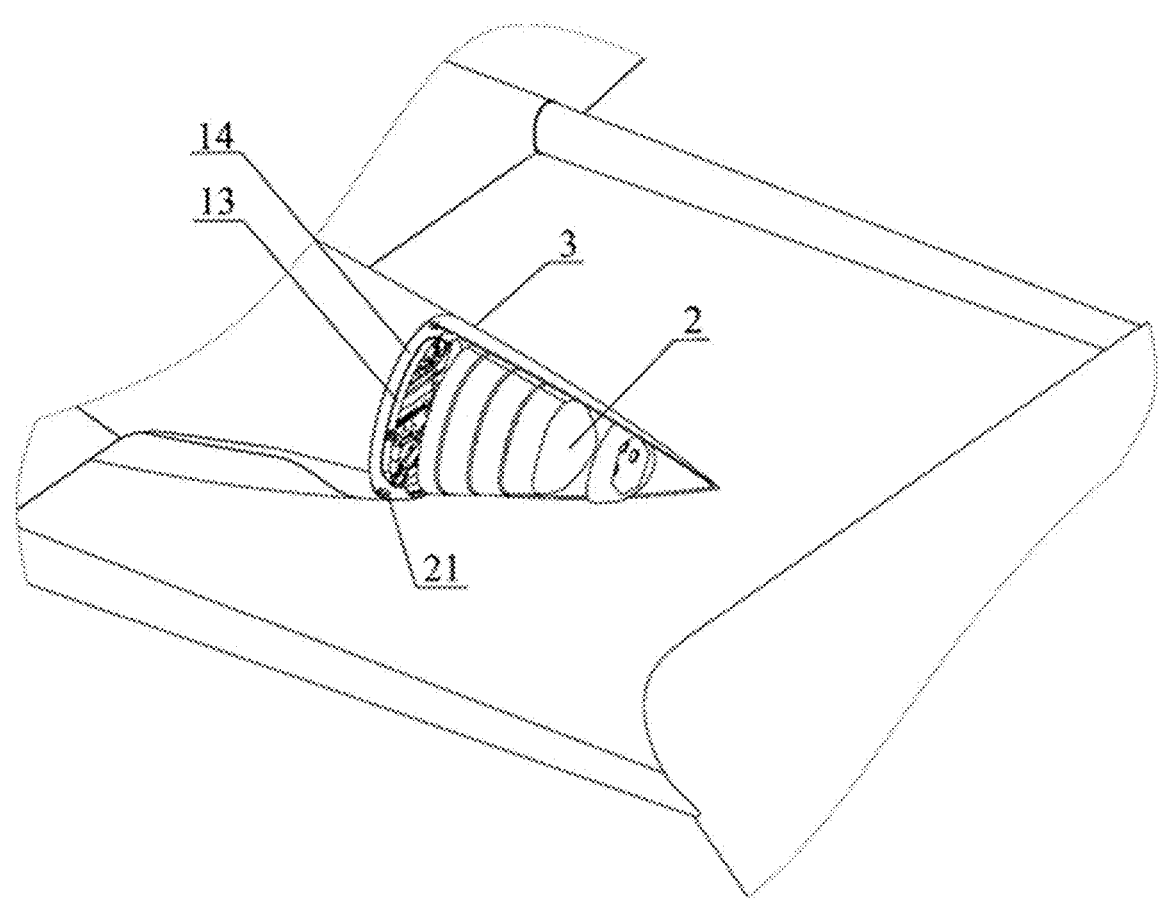
FIG. 5 illustrates an enlarged cross-sectional view of the equipped parachute compartment.

MAIN DESIGNATIONS 1 the UAV,
2 the parachute, 3 the parachute compartment, 4 the airbag, 5 the airbag onboard compartment, 6 the hinged hatch cover, 7 the parachute canopy, 8 the suspension lines of the canopy, 9 the central suspension line, 10 the parachute release mechanism, 11 the suspension lines for securing to the fuselage, 12 fasteners of the fuselage suspension lines, 13 the parachute compartment detachment mechanism, 14 the bulkhead of the fuselage tail section, 15 the pins, 16 the rod, 17 the central rotatable disc, 18 the servomotor, 19 the spring-loaded rod, 20 the guides of the pins, 21 the holes of the parachute compartment, 22 a sector-shaped cutout, 23 a locking pin, 24 the thick halyard, 25 the detent of the hinged hatch cover, 26 the servomotor of the hatch cover lock, 27 a lock of the hinged hatch cover, 28 the impeller, 29 the airbag chambers, 30 a distribution channel, 31 an air charging sleeve, 32 a halyard for securing the parachute compartment to the parachute, 33 a carabiner for securing the central suspension line.

The illustrative materials that explain the claimed invention and the disclosed specific exemplary embodiments do not limit the claimed scope of rights in any way, rather they only explain the essence of the invention and confirm that its implementation is possible. Obvious modifications of the embodiment of the invention may be easily made by persons skilled in this field of art without falling beyond the essence thereof.

IMPLEMENTATION OF THE INVENTION

FIG. 1-FIG. 4 illustrate a general view of a fixed-wing UAV (1) and the claimed landing system, the system comprises a parachute (2) that is arranged in a parachute compartment (3) that is coupled to a fuselage tail section and is preferably cone-shaped, and an airbag (4) that is arranged in an airbag onboard compartment (5) in a fuselage upper part, the onboard airbag compartment is closed with a hinged hatch cover (6) that is secured on the airbag onboard compartment (5).

Figure 6:
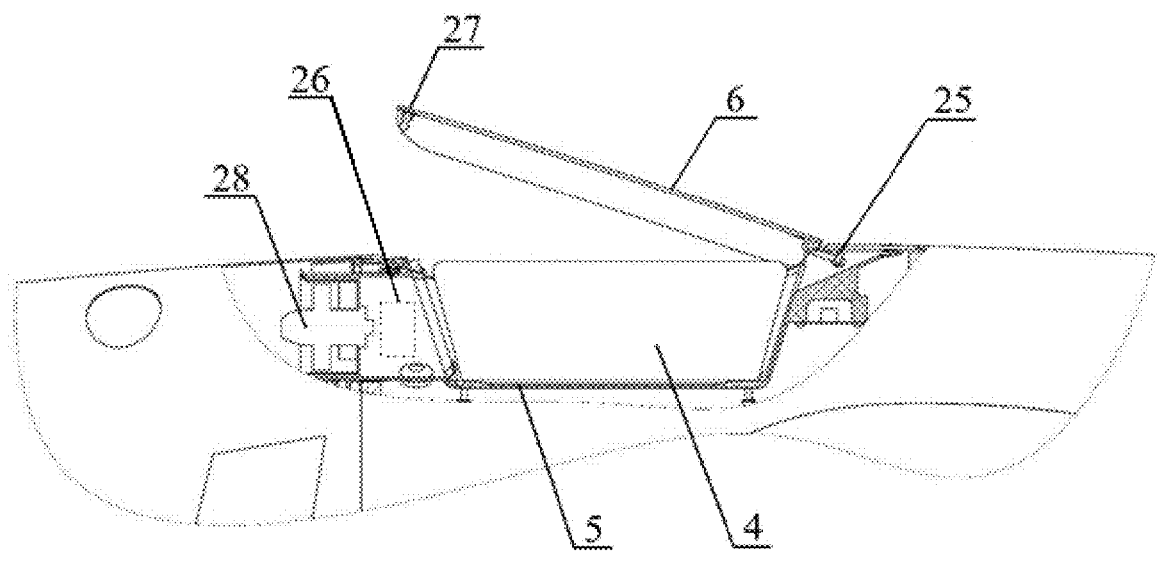
FIG. 6 illustrates an enlarged cross-sectional view of the equipped airbag compartment.
Figure 8:
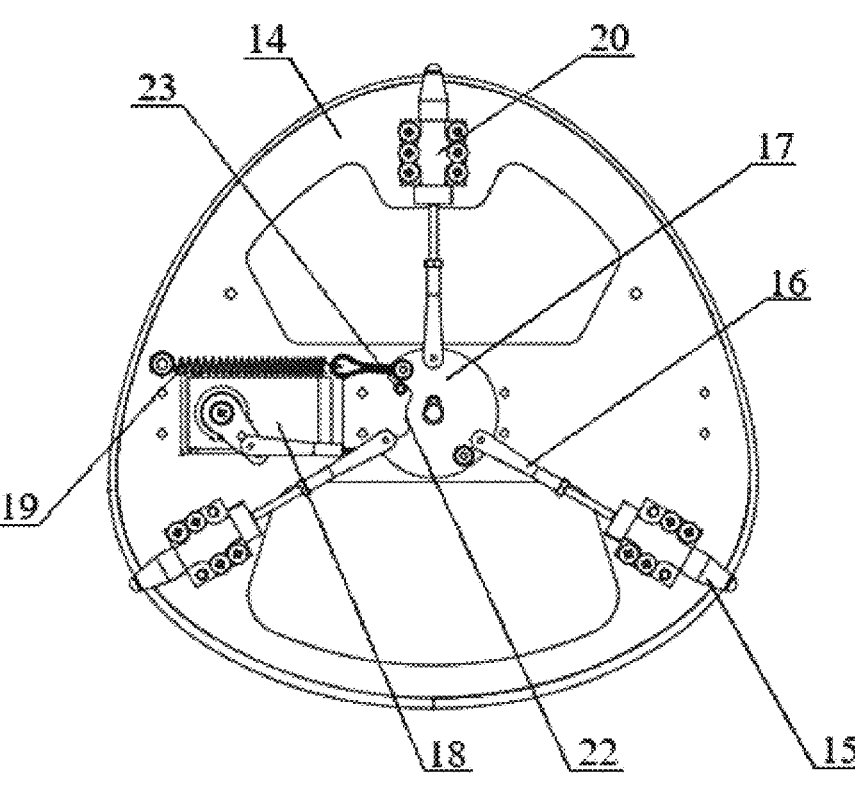
FIG. 8 illustrates the parachute compartment detachment mechanism in the "closed" position, according to independent claim.
Figure 9:
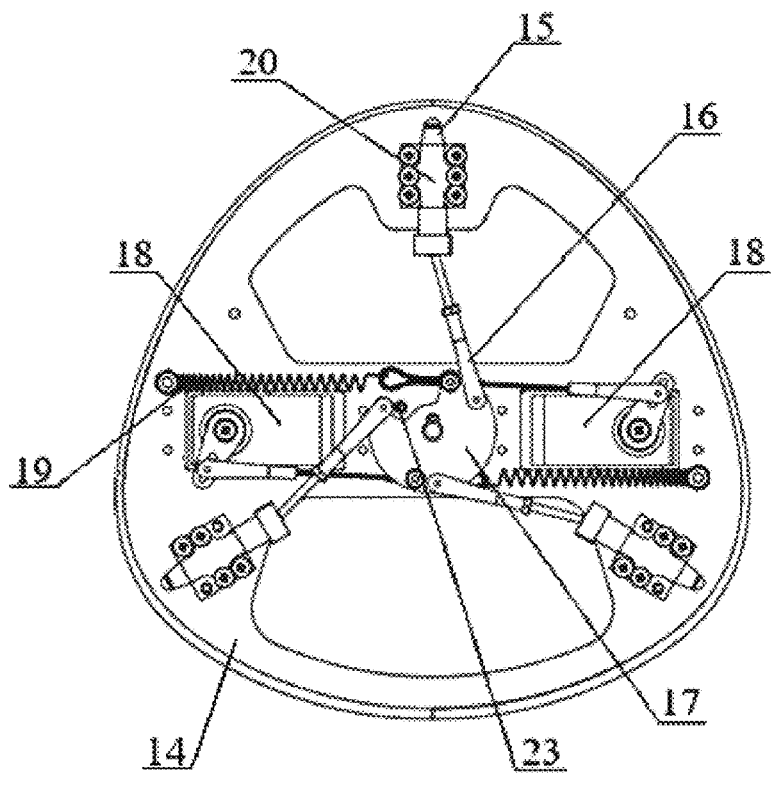
FIG. 9 illustrates the parachute compartment detachment mechanism in the "open" position, according to the preferable exemplary embodiment.
Figure 10:
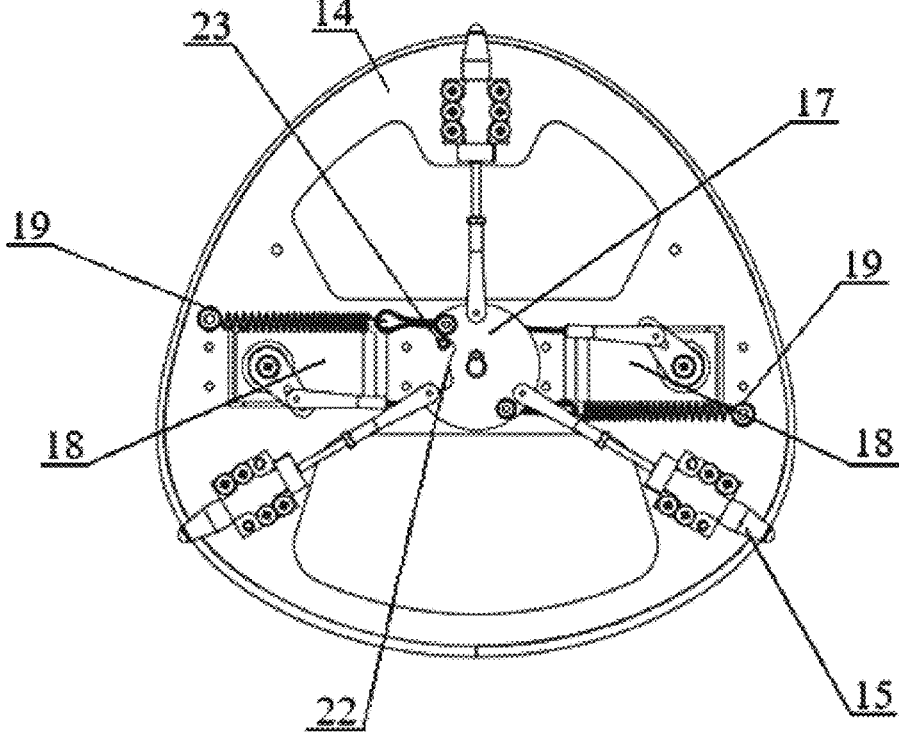
FIG. 10 illustrates the parachute compartment detachment mechanism in the "closed" position, according to the preferable exemplary embodiment.

The parachute comprises a canopy (7) that is preferably cross-shaped and a system of suspension lines that comprises suspension lines (8) of the canopy, a central suspension line (9) that is connected, via a thick halyard (24), to a parachute release mechanism (10) that is actuated after the UAV contacts a landing point, and suspension lines (11) for securing to the fuselage that are connected to the central suspension line (9) via the thick halyards (24) and secured by four fasteners (12) on a fuselage lower part. The parachute (2) is released due to detachment of the parachute compartment (3) that is illustrated with its enlarged view in FIG. 6, upon activation of the parachute compartment detachment mechanism (13). FIG. 8-FIG. 10 illustrate a detailed view of the parachute compartment detachment mechanism (13) that is secured on a bulkhead of the fuselage tail section (14) and comprises at least three pins (15) that are hinged to rods (16) that are secured on a central rotatable disc (17) that is coupled to at least one servomotor (18) by means of a spring-loaded rod (19). Therewith, the pins (15) are mounted in guides of the pins (20) such that free ends of the pins (15) are capable of fitting into corresponding holes (21) of the parachute compartment, which are provided along a parachute compartment (3) perimeter. In order to ensure a more reliable actuation, the parachute compartment detachment mechanism (13) may be provided with two servomotors (18) and two respective spring-loaded rods (19) that are connected to opposite sides of the central rotatable disc (17) in diametrically opposite directions to ensure uniform distribution of forces that act on the pins (15). In order to limit a rotation angle of the central rotatable disc (17), it may be provided with a sector-shaped cutout (22), while the former is provided with a corresponding locking pins (23).

The parachute compartment (3) that is cone-shaped in a preferable exemplary embodiment receives a preliminary folded parachute (2) together with parachute release mechanism (10) and two thick halyards (24), and ends of the suspension lines (11) for securing to the fuselage that are secured to one of the thick halyards, while the central suspension line (9) is secured to another thick halyard by means of a carabiner (33). Therewith, a halyard (32) that is connected to the parachute compartment (3) may be coupled to an external surface of a center of the parachute canopy (7) in order to avoid a loss of the parachute compartment during detachment from the fuselage. After the parachute (2) is folded, the parachute compartment (3) is secured on the fuselage using pins (15) of the parachute compartment detachment mechanism (13) by coupling them to the holes (21) of the parachute compartment (3).

Figure 7:
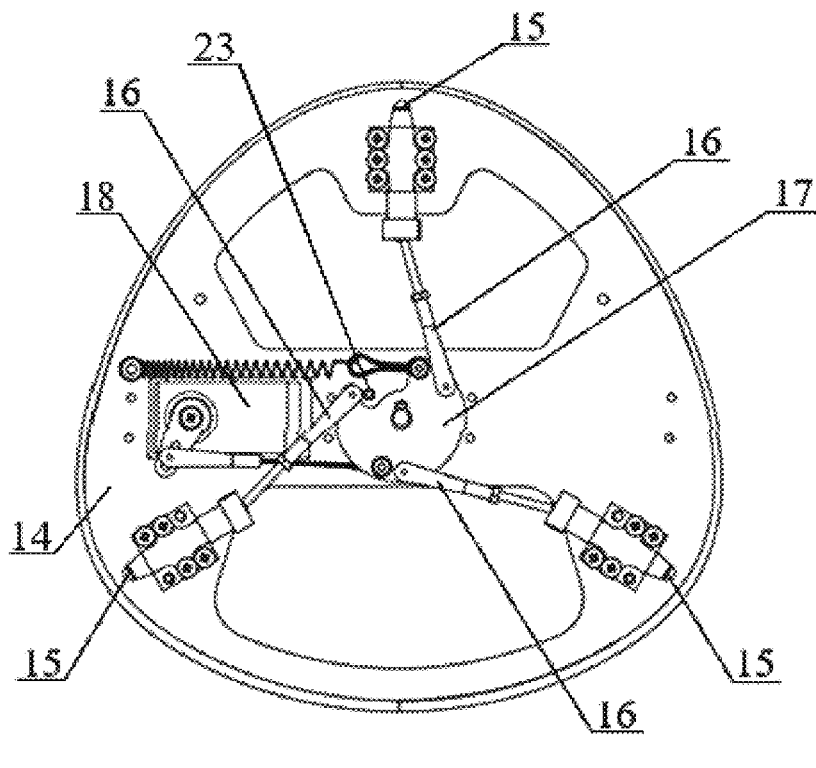
FIG. 7 illustrates the parachute compartment detachment mechanism in the "open" position, according to independent claim.
Figure 11:
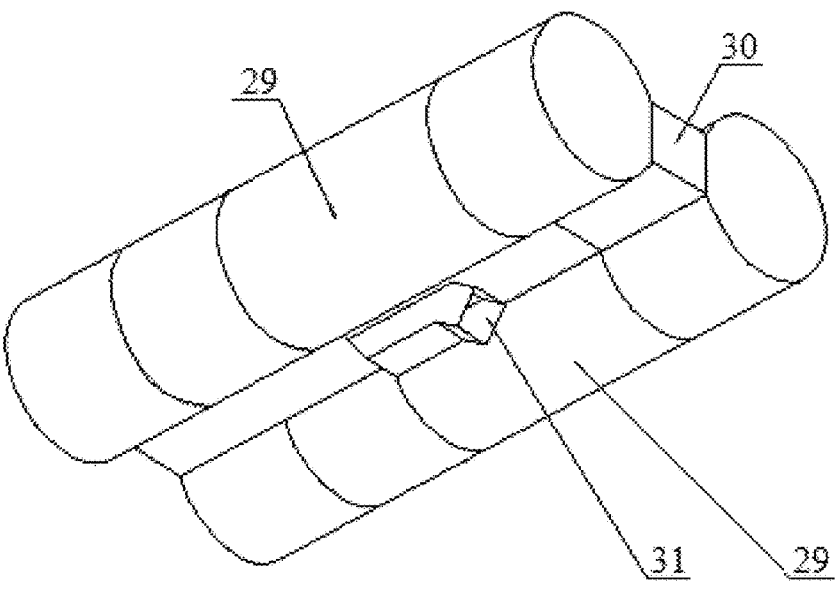
FIG. 11 illustrates a view of the airbag in the deployed state, according to the preferable exemplary embodiment.

In order to ensure quick inflation of the airbag (4), it is coupled to the impeller (28) that may comprise a blade screw, an electromotor and a current controller, and it may be positioned in the fuselage outside the onboard compartment (5) that is illustrated with its enlarged view in FIG. 7. The airbag (4) has a parallelepiped shape in its deployed state or, according to a preferable exemplary embodiment as illustrated in FIG. 11, it is made as two elongated balloons that are formed by two chambers of the airbag (29) that are coupled via a distribution channel (30) having an air charging sleeve (31) in order to couple to the impeller (28). The airbag (4) is released from the onboard compartment (5) by opening the hinged hatch cover (6) by means of an airbag hatch cover control mechanism that comprises a lock (27) of the hinged hatch cover that is unlocked by a servomotor (26), thereby causing a rotation of the hinged hatch cover (6) around a detent (25) and a detachment from the airbag onboard compartment (5). According to a possible exemplary embodiment of the invention, in order to avoid loss of the hinged hatch cover (6), it may be connected to the fuselage by means of a thin halyard (that is not illustrated in the drawings).

In order to ensure a reliable actuation of the elements of the landing system, the impeller (28) of the airbag (4) must be turned on after unlocking the lock (27) of the hinged hatch cover that, in turn, must be actuated after activation of the parachute compartment detachment mechanism (13). This possibility is implemented at a step of compiling a flight mission program, and initialization of the activation of the landing system is performed by an autopilot of the UAV (1) automatically during execution of the flight mission program. If necessary, an operator can initialize activation of the system at any step of the UAV flight by means of the parachute (2) emergency deployment command that is sent from a control panel of a ground flight control station.

After the landing system is activated, the parachute compartment detachment mechanism (13) is actuated, thereby resulting in release of the parachute and inflation of its canopy with air due to a relative airflow. The parachute compartment detachment mechanism (13) is actuated due to imparting a rotational movement to the central rotatable disc (17) by the servomotor (18), and the three hinged pins (15) makes the parachute compartment (3) free, while moving freely in the pin guides (20), and they return to their initial position after being released. After the parachute compartment detachment mechanism (13) is actuated, the hinged hatch cover (6) of the airbag (4) becomes free by means of the servomotor (26) mechanism of the hatch cover lock, and then the impeller (28) is actuated in order to inflate the airbag (4).

Figure 12:
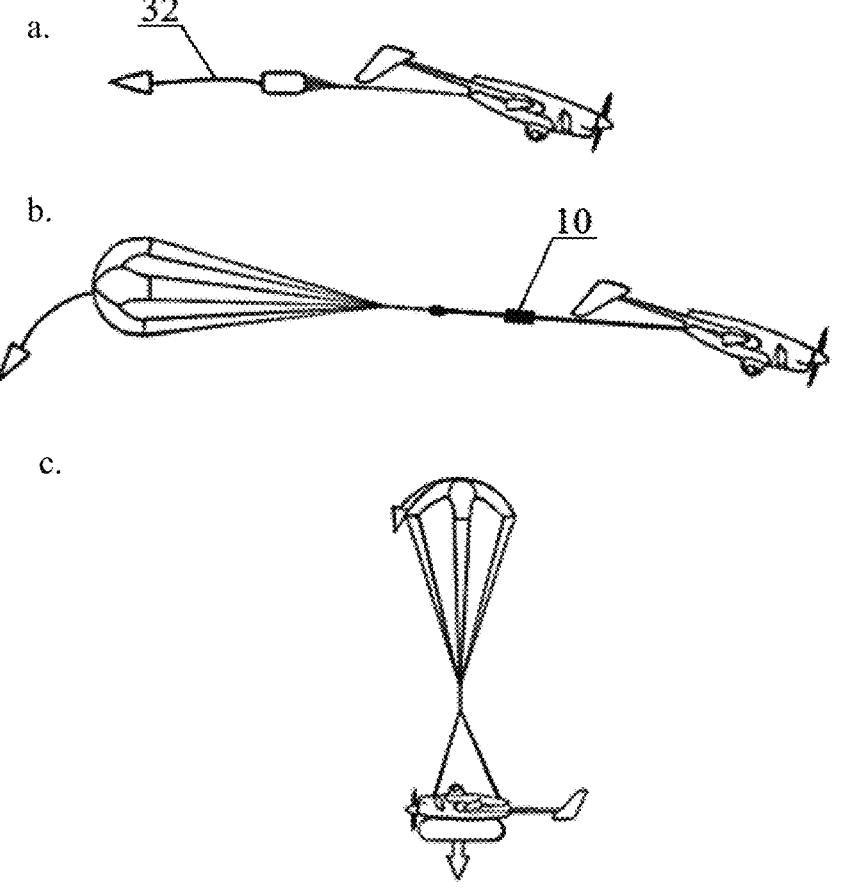
FIG. 12 illustrates steps of the UAV landing using the claimed system.

Implementation of the landing process is schematically illustrated in FIG. 12 which shows positions of the UAV and the landing system elements after activation of the landing procedure, namely:

(a)—detachment of the parachute compartment (3), release and start of the parachute (2) deployment outside the UAV (1) rear part;

(b)—braking during inflation of the parachute (2) with simultaneous loading and taking the vertical inverted position of the UAV (1) due to the suspension lines (11) for securing to the fuselage;

(c)—landing of the UAV (1) in the vertical position on the deployed airbag (4).

The UAV slowly lands vertically and in the inverted manner under action of aerodynamic resistance onto the parachute (2) after loading above the landing point, and an energy-absorbing contact with the landing surface is established using the airbag (4), and during this contact, the workload is located on the opposite side and does not receive an impact from the landing surface. At the same time, according to one of exemplary embodiments, a size of the airbag helps to protect not only an onboard equipment, but the UAV elements as well.

Therefore, the landing system and implementation of all features thereof that are set forth in the present claims of the invention ensures reliability of actuation of both landing devices, safe landing of the UAV, and protection of its onboard equipment.

The invention claimed is:

1. A landing system for a fixed-wing unmanned aerial vehicle (UAV), the system comprising a parachute having a system of suspension lines that comprises suspension lines for securing to a fuselage, a central suspension line that is connected to upper ends of the fuselage suspension lines, and suspension lines of a parachute canopy, the parachute is arranged in a parachute compartment that is detachably coupled to a fuselage tail section and an airbag that is coupled to an impeller and arranged in an onboard compartment of the fuselage having a hinged hatch cover fixed thereon, wherein lower ends of the suspension lines for securing to the fuselage are fixed in four points on a fuselage lower part symmetrically relative to the UAV's center of gravity, the detachability of the parachute compartment is ensured by a mechanism that is secured on a bulkhead of the fuselage tail section and comprises at least three pins that are hinged to rods that are fixed on a central rotatable disc that is coupled to at least one servomotor by means of a spring-loaded rod, and the pins are mounted in guides such that free ends of the pins are capable of fitting into corresponding holes that are provided along a parachute compartment perimeter, the airbag onboard compartment is arranged in the fuselage upper part, and the hatch cover is fixed to the compartment by means of a lock having a servomotor and a detent that are configured to release the hatch cover, and the impeller is configured to be activated after unlocking the hatch cover lock that is configured to be actuated after activation of the parachute compartment detachment mechanism.

2. The system according to claim 1, wherein the rotatable disc is coupled to two servomotors using two spring-loaded rods that are connected to the disc's opposite sides in diametrically opposite directions.

3. The system according to claim 1, wherein the rotatable disc is provided with a sector-shaped cutout, while a locking pin is mounted on the bulkhead.

4. The system according to claim 1, wherein the central suspension line of the parachute and the suspension lines for securing to the fuselage are connected to each other via a pair of halyards having a parachute release mechanism between them, and the parachute release mechanism is configured to be actuated when the UAV contacts a landing point.

5. The system according to claim 1, wherein the parachute compartment is connected to the parachute, and the hinged hatch cover is connected to the fuselage by means of halyards.

6. The system according to claim 1, wherein the parachute compartment is cone-shaped.

7. The system according to claim 1, wherein an airbag perimeter in the deployed state is greater than a fuselage perimeter.

8. The system according to claim 1, wherein the airbag has a parallelepiped shape or a shape of two elongated balloons.

\* \* \* \* \*